3,494,882
WATER REDUCIBLE GLOSS ENAMELS
Robert P. Andrews, New Albany, Ind., assignor to Celanese Coatings Company, New York, N.Y., a corporation of Delaware
No Drawing. Filed Aug. 9, 1967, Ser. No. 659,291
Int. Cl. C09d 3/76
U.S. Cl. 260—22          11 Claims

ABSTRACT OF THE DISCLOSURE

Water reducible gloss enamels are made by dispersing pigments in an aqueous emulsion of an air-drying fatty acid modified polyester containing a nonionic or anionic surfactant or mixtures thereof and a nitrogen base having a pKa value of 8.7 to 10 followed by blending the pigmented emulsion with a synthetic polymeric latex.

BACKGROUND OF THE INVENTION

This invention pertains to high gloss water reducible enamels and processes for preparing such enamels. In particular this invention relates to high gloss pigmented enamels made from an air-drying fatty acid modified polyester emulsified in water and then blended with a synthetic polymeric latex.

The main difference between a flat paint and a semi-gloss or gloss enamel, in conventional non-aqueous paint systems, is the difference in the pigment volume concentration. Pigment volume concentration, commonly referred to as PVC, is the concentration or percent pigment by volume in the dry coating. Generally an acceptable semi-gloss or gloss enamel can be made from a flat paint formulation by simply lowering the PVC. This is not the case, however, with a water reducible paint made with a latex vehicle. Lowering the PVC of typical flat latex wall paints results in paints which have some degree of angular sheen but no depth of reflected gloss. U.S. Patent 3,150,110, describes high gloss latex paints made from very small particle size latices with low amounts of pigments. Such paints have poor durability and poor hiding properties. They are uneconomical in that several coats of the paint are required in order to obtain adequate coverage of the substrate or undercoating. These paints have poor drying properties and soften excessively in warm or hot environments.

Paints which have some degree of gloss have been made by modifying a latex paint with a water soluble or water dispersible resin. Generally such paints have 60° glossmeter readings of less than 60 and have a sheen rather than a true depth of gloss. In addition the stability of the paints before use and the durability and adhesion of the paints after use have been a problem.

SUMMARY OF THE INVENTION

By this invention water reducible paints are prepared which produce coatings having a high degree of depth of reflected gloss—at least 60 and as high as 90 as determined by 60° glossmeter readings—and excellent hiding powers—contrast ratios of about 0.8 to about 1. These paints have excellent shelf stability and produce coatings with good durability and adhesion to glossy substrates.

The high gloss water reducible paints of this invention are made by: (1) emulsifying in water an air-drying unsaturated fatty acid modified polyester using nonionic or anionic surfactants or mixtures thereof plus a nitrogen base; (2) dispersing pigments in the emulsion and (3) blending the resulting pigment dispersion with a synthetic polymeric latex.

In particular this invention is directed to the use of a nitrogen base having a pKa value of about 8.7 to about 10 in the initial emulsification of the air-drying fatty acid modified polyester. Paints made from synthetic polymeric latices, pigments and polyester emulsions which do not contain the nitrogen base either flocculate upon the combination of the components or do not produce high gloss coatings. Furthermore, when a base is used which has a pKa value outside the range of about 8.7 to about 10, the paints either lack storage stability or produce coatings which are low in gloss.

DESCRIPTION OF THE INVENTION

The air drying fatty acid modified polyesters used in this invention are polyesters well known in the paint and varnish industry. Particularly useful polyesters are the alkyd resins, which are reaction products of polyhydric alcohols and polybasic acids, modified with drying or semi-drying oils or fatty acids derived from such oils. The most widely used alkyd resins are the glyceryl phthalate resins, but other types are also included under this term. Polyhydric alcohols which can be used in making alkyd resins include glycerol, trimethylol ethane, trimethylol propane, pentaerythritol, dipentaerythritol, dipropylene glycol, and the like. Polybasic acid reactants are phthalic anhydride, isophthalic acid, terephthalic acid, succinic anhydride, adipic acid, azelaic acid, dimerized and trimerized unsaturated fatty acids, etc. The air drying alkyd resins used in this invention are modified with drying or semi-drying oils or unsaturated fatty acids derived from such oils. Examples of such oils are linseed oil, soybean oil, dehydrated castor oil, tall oil, oiticica oil, perilla oil, poppyseed oil, safflower oil, sunflower oil and the like. The fatty acid modified alkyd resins useful in this invention contain at least about 40 weight percent, based on the total weight of resin, of fatty acid modification, and preferably about 50–70 percent. The preferred alkyd resins are those which have low acid values, below about 30, and which are insoluble in ammonia or amine water.

Other useful air-drying fatty acid modified polyesters are esters made by reacting semi-drying or drying oil fatty acids with epoxide resins. Such epoxy esters are described in U.S. Patents 2,456,408, 2,493,486, and 2,653,141. The preferred epoxide resins from which the epoxy esters are derived are the glycidyl polyethers of polyhydric phenols, but other epoxy resins, such as those made by the peroxidation of unsaturated compounds, are also useful.

Included among the air-drying fatty acid modified polyesters are the naturally occurring drying oils which have iodine values above about 130, such as safflower oil, linseed oil, perilla oil, etc. Other oils are dehydrated castor oil, alcoholysis products of the naturally occurring drying oils with aliphatic polyols, and synthetic drying oils made by reacting unsaturated fatty acids with aliphatic polyols other than glycerol.

The air-drying fatty acid modified polyesters described hereinbefore can be further modified by reaction with silicone resins, hydrocarbon resins, polyisocyanates, and polymerizable monomers—styrene, cyclopentadiene and the like. These and other useful polyesters are described in "Organic Coating Technology," vol. I, by H. F. Payne, John Wiley & Sons, New York (1954).

The air-drying fatty acid modified polyesters useful in this invention have a semi-drying or drying oil fatty acid content (oil length) of at least about 40% (the upper limit being 100% when a drying oil per se is used), the preferred range of fatty acid content being 50–70%, and an acid value of 0 to 30, preferably below about 20.

In carrying out this invention the air-drying fatty acid modified polyesters are mixed with water containing a nitrogen base having a pKa value of about 8.7 to about 10 and are emulsified with nonionic or anionic surfactants using powerful agitation. Polyesters which have softening points at or below room temperature can be added to the water at 100% solids. However, polyesters which have softening points above room temperature are preferably added to the water as a solution in an organic solvent. The preferred organic solvents are water insoluble aliphatic and aromatic hydrocarbons, such as mineral spirits, naphtha, xylene, and toluene. However, a portion of the solvent, up to about 40%, can be water soluble or partially water soluble alcohols, ether alcohols and esters. Sufficient solvent is used to render the solutions fluid at room temperature. Generally this amount of solvent will be up to about 50 weight percent based on the weight of the solution.

The amount of air-drying fatty acid modified polyester which is incorporated in this initial emulsion will range from about 10% to about 75% by weight based on the total initial emulsion weight and preferably about 20 to 50 weight percent.

Nitrogen bases which are utilized in making the initial emulsion of this invention have pKa values of about 8.7 to about 10 and preferably 9.0 to 9.75. pKa is the negative logarithm of the ionization constant and is defined in "Ionization Constants of Acids and Bases," by Albert and Serjeant, John Wiley & Sons, New York (1962). Examples of nitrogen bases which are useful in this invention include ammonia and amines such as 2-amino-2-methyl-1-propanol, diethanol amine, monoethanol amine, trimethyl amine, morpholine, benzyl amine, ethoxycarbonylethyl amine, phenylethyl amine, methoxyethyl and 4-aminopyridine. Other nitrogen bases include amides and substituted amides such as O-methylisourea and S-methylisothiourea.

The amount of ammonia which is used in the initial emulsion of this invention is about 1 to 4 weight percent based on the weight of polyester solids. Ammonia can be added as a gas but is preferably added as an aqueous solution. The nitrogen bases other than ammonia are used in the amounts of about 4 to 12 weight percent based on the weight of polyester solids. Although high gloss enamels can be made using ammonia or other nitrogen bases within the designated ranges, the optimum amount within these ranges will vary somewhat depending upon the particular amine being used and the particular polyester being emulsified. Ammonia and low boiling amines are the preferred nitrogen bases in that they volatilize from the paint film after it is applied and thus do not impart water sensitization, discoloration or drying inhibition to the paint film.

The surfactants which are useful in preparing the initial emulsion of polyester in water are well-known anionic and nonionic surfactants such as alkylphenoxy(ethyleneoxy) ethanols, polyethylene glycol fatty acids, ethoxylated fatty alcohols, alkali metal salts of polymeric carboxylic acids and alkali metal salts of condensed naphthalene sulfonic acids. Paints having good gloss can be made from an emulsion of polyester wherein only anionic surfactants and no nonionic surfactants are used. However, nonionic or mixtures of nonionic and anionic surfactants are preferred, since paints having improved gloss and better drying properties result with increase of nonionic and decrease of anionic surfactant content.

Surfactants which are useful in this invention can be identified by HLB values. HLB value is the numerical representation of the hydrophilic and lipophilic tendencies of the compositions and is described in Official Digest, vol. 28, pp: 446–455 (1956), published by the Federation of Paint and Varnish Production Clubs. When emulsification of the polyester is attempted with a surfactant having an HLB value below 8, no inversion takes place. At HLB values between 8 and 12, inversion is difficult to accomplish, the gloss of the finished paint is poor, and clean-up cannot be accomplished without a solvent. Surfactants which have HLB values of 16 to 20 give good inversion in the initial emulsification step, but excessive foam is formed in formulating the paint and the finished paint is extremely water sensitive. The best overall properties are obtained using surfactants having HLB values of 12 to 16. A single surfactant having this 12 to 16 value is satisfactory but, surprisingly, the preferred surfactant system is a blend of two or more surfactants in which at least one surfactant has an HLB value below 12, about 9 to 11, and at least one other has an HLB value above 16, about 17 to 19, the actual HLB value of the blend being 12 to 16.

The amount of surfactant used is about 0.1 to about 1.0 weight percent based on the weight of the paint and preferably about 0.2 to about 0.4 weight percent. The amount of surfactant is based on the weight of paint rather than the initial emulsion because the surfactant contributes not only to the emulsification of the polyester but also to the dispersion of the pigment and the quantity of the pigment must be considered in the calculation.

The pigments which are used in this invention are the well known water insoluble pigments and extenders used in water reducible coatings. The most important pigment is titanium dioxide which is used in all the paint formulations. In order to obtain a high degree of gloss the titanium dioxide and other pigments or extenders must be dispersed directly in the initial emulsion of polyester in water. If the pigment is ground or dispersed in water and then added to the emulsion, the finished paint is flat or low in gloss. Barytes, silica, clay, magnesium silicate and the like are preferably added with the titanium dioxide. Other pigments, such as lamp black, red iron oxide, yellow ocher, phthalocyanine pigments, chromium oxide green and Hansa yellow, can be added with the titanium dioxide or can be added as a paste to the final formulation. The pigments are dispersed in the initial emulsion of the air-drying fatty acid modified polyester of this invention using high shear dispersing means such as the Cowles dissolver, roller mill, pebble mill, etc.

The amount of pigment used in the compositions of this invention will be from about 20 to about 35% PVC, i.e., the percent pigment by volume in the total volume of non-volatile solids in the total paint. The exact amount of pigment used will vary depending on the degree of gloss desired, generally the less pigment the higher the gloss. Generally a high gloss, a 60° glossmeter reading of 80–90, is produced with a PVC of 20–21; a gloss, 60–80 glossmeter readings, is produced with a PVC of 21–25; a semi-gloss, glossmeter readings of 50–60, and a sheen, glossmeter readings of 40–50, are produced when the PVC is above 25.

The synthetic polymeric latices used in this invention are the latices made by emulsion polymerization and copolymerization of polymerizable ethylenically unsaturated monomers in water in the presence of free radical producing catalysts and surfactants. Examples of synthetic polymeric latices are latices of polyvinyl acetate, copolymers of vinyl acetate with other monomers such as dibutyl fumarate, ethylene, ethyl acrylate, dibutyl maleate, butyl acrylate and 2-ethylhexyl acrylate, acrylic ester polymers and copolymers, butadiene-styrene copolymers and the like. The preferred synthetic polymeric latices are latices of copolymers of vinyl acetate with ethyl acrylate or 2-ethylhexyl acrylate. The term copolymer is meant to include polymers containing 2 or more monomer components.

The synthetic polymeric latices are blended with the dispersion of pigment in emulsified air drying fatty acid modified polyester using moderate shear mixing. The amount of latex used in this invention will range from about 80 to 50 weight percent latex solids based on the total weight of latex solids and polyester solids. The preferred amounts of latex solids will be about 78 to 70 weight percent.

In addition to the component hereinbefore set forth, small amounts of perfumed odor maskers, thickeners such as hydroxyethyl cellulose, defoamers, fungicides, antibacterial agents, anti-blocking agents, coupling agents, and metallic dryers can be used to advantage in this invention.

The gloss readings in the following examples were made with a photovolt glossmeter at an incidence angle from the vertical plane of 60° as described in "Paint Testing Manual," by Gardner and Sward, twelfth edition, March 1962. The contrast ratio, which is a method for determining the hiding power of the paint, is described in "Organic Coating Technology," vol. II, by H. F. Payne, John Wiley & Sons, Inc., New York (1961). Parts and percentages unless otherwise designated are parts by weight.

EXAMPLE 1

To a suitable container were added 86.5 parts of a 70% solution of a soybean oil modified phthalic anhydride-pentaerythritol polyester in mineral spirits. The modified polyester contained 64.42% soybean oil, 33.16% phthalic anhydride and pentaerythritol in equimolar proportions and 2.42% excess pentaerythritol, had an acid value of 4–7 and Gardner-Holdt viscosity at 25° C. of X–Z at 70% solids. To the polyester were added 0.5 part of a vanilin odor masker and 7.5 parts of a 28% solution of ammonia in water. 9 parts of nonylphenoxypoly(ethyleneoxy) ethanol having an HLB value of 18.5 and 9 parts of nonylphenoxypoly(ethyleneoxy) ethanol having an HLB value of 9 were premixed with 150 parts of water. This mixture was then added to the polyester under strong agitation to form a stable creamy emulsion.

To the emulsion were added 2.9 parts of hydroxyethyl cellulose, 5.55 parts of ethylene glycol, 1.9 parts of defoamer and 250 parts of rutile titanium dioxide. The mixture was then dispersed in a Cowles dissolver for a period of 30 minutes.

To the dispersion were blended 1.5 parts of lead neodecanoate, 0.6 part of cobalt neodecanoate, 1.9 parts of a 28% solution of ammonia in water, 88.9 parts of water, 1.0 part of phenyl mercuric acetate, 2.9 parts of defoamer, 3.9 parts of pine oil, 44 parts of anti-blocking agent and 340 parts of a synthetic polymeric latex composed of a terpolymer of 75% vinyl acetate, 18% ethyl acrylate and 7% dioctyl maleate at 65% solids in water. After thorough mixing a smooth stable paint resulted.

Coatings made from the paint dried to a smooth glossy finish after 4 hours. After drying overnight, the coatings had a gloss reading of 80 to 85 and a contrast ratio of 0.99.

When the same formulation was repeated in the same manner but without the addition of ammonia, complete flocculation occurred.

EXAMPLE 2

A semi-gloss paint was prepared using the same formulation as described in Example 1 plus the addition of 75 parts of finely divided calcium carbonate which was added with the titanium dioxide. This paint gave a glossmeter reading of 45 and a contrast ratio of 0.99.

EXAMPLE 3

Using the formula given below a series of paints was made wherein the nitrogen base was varied. The formula used was:

| Component | Parts | Gallons |
|---|---|---|
| Polyester of Example 1 | 86.5 | 11.00 |
| Nitrogen base | Varied | |
| Defoamer | 1.0 | 0.13 |
| Nonylphenoxypoly (ethyleneoxy) ethanol—HLB 11 | 13.3 | 1.5 |
| Nonylphenoxypoly (ethyleneoxy) ethanol HLB—18.5 | 2.8 | 0.3 |
| Water | 100 | 12.0 |
| Emulsified with high shear agitation | | |
| Hydroxyethyl cellulose | 3.0 | 0.29 |
| Ethylene glycol | 69.5 | 7.50 |
| Defoamer | 3.8 | 0.5 |
| Titanium dioxide (rutile) | 250.0 | 7.3 |
| Dispersed in a Cowles Dissolver for 30 minutes | | |
| Lead neodecanoate (24% lead) | 1.5 | 0.15 |
| Cobalt neodecanoate (10% cobalt) | 0.6 | 0.06 |
| Calcium neodecanoate (5% calcium) | 1.4 | 0.15 |
| Phenylmercuric acetate | 1.0 | 0.09 |
| Defoamer | 3.8 | 0.50 |
| Synthetic polymeric latex of Example 1 | 342.0 | 37.20 |
| Water | Sufficient to bring total formula to 100 gallons | |

Thoroughly blended to form a smooth paint.

Various nitrogen bases in varying amounts were used in the above formula. Coatings were made from the resulting paints and the amount of gloss and hiding power were determined. The nitrogen bases and the results were as follows:

| Nitrogen base | Percent base based on polyester | Gloss | Contrast ratio |
|---|---|---|---|
| 2-amino-2-methyl-1-propanol—pKa 9.69 | 2.58 | 5 | 0.87 |
| Do | 4.74 | 65 | 0.98 |
| Do | 6.37 | 78 | 0.969 |
| Do | 12.00 | 87 | 0.97 |
| Do | 17.00 | 48 | 0.987 |
| Benzyl trimethyl ammonium chloride—pKa > 12.0 | 2.61 | 17 | 0.975 |
| Do | 11.10 | 34 | 0.97 |
| Diethyl amine—pKa 10.93 | 5.33 | 45 | 0.969 |
| Triethyl amine pKa 10.87 | 7.9 | 19 | 0.944 |
| Diethanol amine—pKa 9.02 | 2.58 | 9 | 0.803 |
| Do | 7.50 | 77 | 0.974 |
| Do | 12.00 | 84 | 0.977 |
| Triethanol amine—pKa 7.82 | 2.58 | 5 | 0.977 |
| Do | 6.37 | 8 | 0.750 |
| Do | 12.0 | Flocculated | |
| Monoethanol amine—pKa 9.5 | 6.37 | 80 | 0.989 |
| Tetraethylenepentamine: pKa (1) 9.985 pKa (2) 6.915 | 6.37 | 79 | 0.98 |

EXAMPLE 4

The formula of Example 3 was repeated using 121 parts of a different polyester solution in place of the 86.5 parts of the polyester described therein. The polyester was a 50% solution in mineral spirits of the reaction product of 52.29% soybean oil, 45.38% phthalic anhydride and glycerine in equimolar proportions and 2.33% excess glycerine. The polyester had an acid value of 4–6 and a Gardner-Holdt viscosity at 25° C. of T–V at 50% solids.

To the formula was added 2-amino-2-methyl-1-propanol (pKa—9.69) in varying amounts and coatings made from the resulting paints were evaluated for gloss and hiding power.

| Percent amine based on polyester | Gloss | Contrast ratio |
|---|---|---|
| 4.0 | 48 | 0.97 |
| 6.08 | 70 | 0.987 |
| 10.00 | 77 | 0.994 |
| 15.00 | 54 | 0.987 |

EXAMPLE 5

The formula of Example 3 was repeated using 65.5 parts of alkali refined safflower oil in place of the polyester.

To the formula was added 2-amino-2-methyl-1-propanol in varying amounts and coatings made from the resulting paints were evaluated for gloss and hiding power.

| Percent Amine based on oil | Gloss | Contrast ratio |
|---|---|---|
| 1.625 | 87 | 0.959 |
| 3.36 | 85 | 0.963 |
| 6.49 | 86 | 0.965 |

EXAMPLE 6

Using the formula given below a series of paints was made wherein different synthetic polymeric latices were used. This formula was as follows:

| Component | Parts | Gallons |
|---|---|---|
| Polyester of Example 1 | 86.5 | 11.00 |
| 2-amino-2-methyl-1-propanol | 4.2 | 0.53 |
| Defoamer | 1.0 | 0.13 |
| Nonylphenoxypoly(ethyleneoxy) ethanol—HLB–18.5 | 8.0 | 0.83 |
| Nonylphenoxypoly(ethyleneoxy) ethanol—HLB–9 | 8.0 | 0.93 |
| Water | 100.0 | 12.0 |
| Emulsified with high shear agitation | | |
| Hydroxyethyl cellulose | 3.0 | 0.29 |
| Ethylene glycol | 92.6 | 10.00 |
| Defoamer | 3.8 | 0.50 |
| Titanium dioxide (rutile) | 250.0 | 7.30 |
| Dispersed in a Cowles Dissolver for 30 minutes | | |
| Lead neodecanoate (24% lead) | 1.5 | 0.15 |
| Cobalt neodecanoate (10% cobalt) | 0.6 | 0.06 |
| Phenyl mercuric acetate | 1.0 | 0.09 |
| Defoamer | 3.8 | 0.50 |
| Synthetic polymeric latex | 222 (on solids basis) | |
| Water | Sufficient to bring formula to 100 gallons | |

Thoroughly blended with good mixing.

The synthetic polymeric latices used in the above formula were:

Latex A—A copolymer of 10–12% ethylene and 88–90% vinyl acetate at 55% solids.

Latex B—A homopolymer of vinyl acetate at 55% solids.

Latex C—A terpolymer of 90% vinyl acetate, 4% methylol acrylamide and 6% 2-ethylhexyl acrylate at 50% solids.

Latex D—A copolymer of 85% styrene and 15% butadiene at 55% solids.

Latex E—A copolymer of 85% vinyl acetate and 15% dioctyl maleate at 65% solids.

Latex F—A terpolymer of 67% ethyl acrylate, 30% methyl methacrylate and 3% methacrylic acid at 44% solids.

The gloss and hiding power of coatings made from the paints were:

| Latex | Gloss | Contrast ratio |
|---|---|---|
| A | 70 | 0.985 |
| B | 60 | 0.989 |
| C | 76 | 0.993 |
| D | 65 | 0.985 |
| E | 65 | 0.995 |
| F | 74 | 0.989 |

It is to be understood that the foregoing detailed description is given merely by way of illustration and that many variations may be made therein without departing from the spirit of the invention.

The embodiment of this invention in which an exclusive property of privilege is claimed is defined as follows:

1. A water reducible paint capable of forming a high gloss coating which comprises
    (a) an initial emulsion in water of 10 to 75 weight percent based on the initial emulsion of an air-drying unsaturated fatty acid modified polyester, said polyester having an acid value of 0–30 and being insoluble in ammonia or amine water, with 0.1 to 1 weight percent based on the total paint of a nonionic or anionic surfactant or mixture thereof, said surfactant or mixture thereof having an average HLB value of 12–16, and a nitrogen base having a pKa value of 8.7 to 10 in the amount of 1 to 4 weight percent when the nitrogen base is ammonia and 4 to 12 weight percent nitrogen base other than ammonia, said weight percents being based on the weight of the polyester solids;
    (b) pigments dispersed in the initial emulsion at a pigment volume concentration of 20 to 35 percent; and
    (c) polymeric synthetic latex prepared by polymerization of ethylenically unsaturated monomers in water in the presence of free radical producing catalysts and surfactants and blended with (a) and (b) in the amount of 50 to 80 weight percent latex solids based upon the total weight of latex solids and polyester.

2. The compositions of claim 1 wherein the nitrogen base is ammonia.

3. The composition of claim 1 wherein the nitrogen base is an amine.

4. The composition of claim 1 wherein the surfactant is a nonionic surfactant.

5. The composition of claim 1 wherein the surfactant is a mixture of surfactants wherein at least one surfactant has an HLB value of 9–11 and at least one other surfactant has an HLB value of 17–19.

6. A water reducible paint capable of forming a high gloss coating which comprises
    (a) an initial emulsion in water of 20 to 50 weight percent based on the weight of initial emulsion of an air-drying fatty acid modified alkyd resin containing 50 to 70 weight percent drying or semi-drying oil fatty acid content, said alkyd resin being insoluble in ammonia or amine water and having an acid value below 20 with 0.2 to 0.4 weight percent based on the total weight of paint of a nonionic surfactant having an HLB value of 12 to 16 and ammonia or an amine having a pKa value of 9.0 to 9.75 wherein the ammonia is present in the amount of 1 to 4 weight percent based on the weight of alkyd resin solids and the amine is present in the amount of 4 to 12 weight percent based on the weight of alkyd resin solids;
    (b) pigments dispersed in the initial emulsions at a pigment volume concentration of 20 to 25 percent; and
    (c) a polymeric latex of a copolymer of vinyl acetate and an acrylate ester of a 2 to 8 carbon alcohol blended with (a) and (b) in the amount of 70 to 78 weight percent latex solids based on the combined weight of latex solids and alkyd resin.

7. The composition of claim 6 wherein the alkyd resin is a phthalic anhydride-polyol polyester modified with 50–70 weight percent soybean oil fatty acids and the pigment is titanium dioxide.

8. The composition of claim 6 wherein the amine is 2-amino-2 methyl-1-propanol.

9. The composition of claim 6 wherein the amine is monoethanol amine.

10. The composition of claim 6 coated on a substrate and dried to a smooth glossy finish, having a 60° glossmeter reading of 60 to 90.

11. A process for preparing a water reducible paint capable of forming a high gloss coating which comprises
    (a) emulsifying in water an air-drying unsaturated fatty acid modified polyester having an acid value of 0–30 and being insoluble in ammonia or amine water in the amount of 10 to 75 weight percent based on the weight of emulsion with 0.1 to 1 weight percent based on the total paint of a nonionic or anionic surfactant or mixture thereof having an average HLB value of 12 to 16 and a nitrogen base having a pKa value of 8.7 to 10 in the amount of 1 to 4 weight percent when the nitrogen base is ammonia and 4 to 12 weight percent nitrogen base other than ammonia, said weight percents being based on the weight of the polyester solids;
(b) dispersing in the emulsion a pigment at a pigment volume concentration of 20 to 35 percent; and
(c) blending the resulting pigment dispersion with a polymeric synthetic latex in the amount of 50 to 80 weight percent latex solids based on the combined weight of latex solids and polyester wherein said polymeric synthetic latex is prepared by polymerization of ethylenically unsaturated monomers in water in the presence of free radical producing catalysts and surfactants.

References Cited

UNITED STATES PATENTS

| | | | |
|---|---|---|---|
| 2,837,444 | 6/1958 | Hahn | 260—29.2 |
| 3,023,177 | 2/1962 | Boucher | 260—21 |
| 3,098,834 | 7/1963 | Jerabek | 260—23.7 |
| 3,150,110 | 9/1964 | Becker et al. | 260—17 |
| 3,223,658 | 12/1965 | Kraft et al. | 260—22 |
| 3,251,790 | 5/1966 | Christenson et al. | 260—18 |
| 3,297,605 | 1/1967 | Schroeder et al. | 260—22 |
| 3,306,866 | 2/1967 | Percival et al. | 260—22 |
| 3,366,563 | 1/1968 | Hart et al. | 204—181 |

FOREIGN PATENTS

| | | |
|---|---|---|
| 566,550 | 11/1958 | Canada. |
| 1,269,493 | 7/1961 | France. |

DONALD E. CZAJA, Primary Examiner

R. W. GRIFFIN, Assistant Examiner

U.S. Cl. X.R.

117—161, 166, 167; 260—16, 17, 23, 23.7, 29.2, 29.6, 30.8, 31.2, 32.2, 32.4, 32.6, 33.2, 33.6, 40, 41.